Patented Nov. 7, 1933

1,933,715

UNITED STATES PATENT OFFICE 1,933,715

MANUFACTURE OF SYNTHETIC RESINS

Roland B. Day, Chicago, Ill., assignor to Universal Oil Products Company, Chicago, Ill., a corporation of South Dakota No Drawing. Application December 18, 1931
Serial No. 581,995

6 Claims. (Cl. 260—2)

This invention relates to the manufacture of resins and refers more particularly to the manufacture of such resins by synthetic polymerization and condensation reactions among organic compounds.

More particularly the invention has reference to a process involving the simultaneous and concurrent polymerization or condensation of furfural and petroleum fractions containing relatively high percentages of olefinic and unsaturated cyclic hydrocarbons. The particular nature of the aldehyde and the petroleum fractions employed and the manner in which the composite resin may be produced will be disclosed fully in the following specification.

In one specific embodiment, the invention comprises the production of condensed resins suitable for electrical insulating materials, phonograph records, rubber substitutes and in general for molded articles resistant to wear and corrosion of a wide variety of forms and shapes by subjecting cracked petroleum distillates to the action of furfural in the presence of sulphuric acid. The distillates may be used as such or may be subjected to a preliminary controlled oxidation to induce polymerization to the desired point.

Furfural, while known as a chemical compound for some time, has but recently become available in commercial quantities as a by-product from the distillation of certain carbohydrates and glucosides, for example bran, waste food material, corn cobs, etc., these materials being usually distilled with dilute sulphuric acid to promote hydrolysis. The principal product of these distillations is the aldehyde of furane, having the general formula $C_4H_3O \cdot CHO$, and having the structural formula

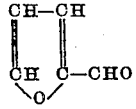

It has a boiling point of 162° C., a specific gravity of 1.163, is a colorless liquid when pure but oxidizes in the air and turns brown like other aldehydes. It has an aromatic odor, is fairly soluble in water and very soluble in alcohol. It shows all the properties of an aldehyde in combining with bi-sulfites, yields furfuryl alcohol on reduction and pyromucic acid on oxidation.

Furfural polymerizes under the influence of elevated temperatures to form different high molecular weight aggregates, some of which are fusible and some infusible.

The cracked distillates which form the other material which is used with furfural to produce moldable resins, according to the process of the present invention, are characterized by the presence of considerable amounts of unsaturated hydrocarbon compounds of both the straight chain and cyclic series. In the former category are included mono-, di- and tri-olefins, and in the second the aromatics and the partially hydrogenated aromatics such as the terpenes. In a general sense the presence of large amounts of unsaturates in cracked distillates is undesirable from the standpoint of stability since their polymerizing tendencies become manifest upon exposure to light and air under storage conditions and a certain amount of gums are deposited along with the simultaneous formation of soluble polymers of higher boiling point range than the original material. The present invention makes profitable use of this property, and employs oxidizing and condensing reagents of both an acid and an alkaline character to accelerate the polymerization reactions and form maximum amounts of high molecular weight compounds which combine with the condensation products of furfural to form high molecular weight aggregates having the desired properties of infusibility, insolubility, etc.

As an example of the method of operation for the production of a moldable resin from furfural and cracked gasoline, 150 parts by volume of commercial furfural may be heated with 250 parts by volume of a cracked gasoline in the presence of 1 percent by weight of sulphuric acid, the treatment being conducted at atmospheric pressure and under refluxing conditions to prevent undue loss of gasoline fractions. At the end of a twenty-minute period the mixture, upon cooling, will have formed a jet black jelly-like mass which can be mixed with wood flour in different proportions, subjected to treatment in hot rolls and worked up into any desired type of molded product.

Similar operations may be conducted using pre-oxidized cracked oils which have been treated with air or other oxidizing gases either alone or in the presence of catalytic materials, the properties of the finished resin depending to some extent upon the nature and extent of the pretreatment.

When using cracked distillates as a whole it may be necessary to grind up and wash the resin with suitable solvents prior to heat treatment to remove a certain amount of residual, unacted upon, oil which constitutes the residue of saturated non-polymerizable material, principally paraffinic and naphthenic compounds.

Valuable products may also be produced by utilizing as the hydrocarbon material only those constituents of the cracked distillates which are removable by such treating agents as sulphuric acid, liquid sulphur dioxide, etc. In the case of sulphuric acid treatments, the sludge is hydrolyzed after the usual manner of sludge recovery and the separated oil which may be considered as partially polymerized hydrocarbon material may be utilized in condensation reactions with furfural. It will be appreciated by those familiar with the nature of unsaturated hydrocarbons that such mixtures will undergo more rapid action than the cracked distillate as a whole and produce in general resins of higher consistency which may need, instead of the washing to remove oily material, rather a washing with water to remove traces of sulphuric acid and its sludge-like reaction products, which if left in the resinous material might impart to it an acid reaction, and a disagreeable odor, particularly when warm.

The oils extracted from petroleum distillates, and particularly cracked petroleum distillates, by liquid sulphur dioxide are particularly adapted to use in the present process, as they constitute in general the more highly unsaturated portions of such distillates. However, since liquid sulphur dioxide acts merely as a solvent and which has none of the oxidizing properties which are characteristic of sulphuric acid, it may be frequently advantageous to subject such fractions, after the removal of sulphur dioxide, to a preliminary mild oxidation prior to their use with furfural.

The particular range of temperature, and to some extent the pressure employed in the process, will depend upon the character of the hydrocarbon oil fractions utilized and the properties desired in the finished product. In many instances when dealing with a highly unsaturated mixture of hydrocarbons such as might be obtained for example by extracting a highly unsaturated vapor phase cracked gasoline with liquid sulphur dioxide, a hard resin may be produced at ordinary temperatures when the slightly oxidized extract is allowed to stand in contact with furfural for a period of time from a few hours to several days. At other times when it appears to be economy to use the cracked distillate as a whole, containing both saturated and unsaturated hydrocarbons, a considerable amount of oxidation may be necessary and the use of elevated temperatures and pressures desirable, the latter particularly to prevent volatilization and loss of hydrocarbon fractions.

Any of the acid or alkaline accelerators may be used to promote the speed of the process and increase the capacity of treating equipment. Among the acid accelerators may be mentioned sulphuric acid, hydrochloric acid, and among the alkaline catalysts caustic soda, ammonia, etc. In general, the use of acid catalysts produces darker colored products than the use of alkaline catalysts, probably due to their greater influence upon the rate of oxidation reactions.

The foregoing specification and examples have sufficiently disclosed and illustrated the process of the invention and made its features and advantages evident in comparison with existing processes. While the description and examples are accurate, the invention is not confined thereto but includes many other examples and modes of operation within its generally broad scope though it has not been deemed necessary to go into further detail for purposes of disclosure.

I claim as my invention:

1. A process for the production of synthetic resins which comprises subjecting hydrocarbon distillates containing a substantial amount of unsaturated hydrocarbons to the action of a solvent to separate the unsaturated hydrocarbons from the relatively saturated hydrocarbons, removing the solvent therefrom and thereafter reacting the separated relatively unsaturated hydrocarbons with furfural.

2. A process for the production of synthetic resins having electrical insulating and non-corrosive properties which comprises separating the relatively unsaturated hydrocarbon components of cracked distillates by means of a solvent, separating the solvent therefrom and reacting the thus separated unsaturated hydrocarbons with furfural.

3. A process for the production of synthetic resins which comprises subjecting hydrocarbon distillates containing a substantial amount of unsaturated hydrocarbons to the action of a liquid sulphur dioxide to separate the unsaturated hydrocarbons from the relatively saturated hydrocarbons, removing the liquid sulphur dioxide therefrom and thereafter causing the separated relatively unsaturated hydrocarbons to be reacted on by furfural in the presence of sulphuric acid.

4. A process for the production of synthetic resins having electrical insulating and non-corrosive properties which comprises separating the relatively unsaturated hydrocarbon components of cracked distillates by means of a liquid sulphur dioxide, removing the liquid sulphur dioxide therefrom and subjecting the liquid sulphur dioxide free unsaturated hydrocarbons to reaction with furfural in the presence of an alkali.

5. The process for the production of synthetic resins which comprises subjecting cracked hydrocarbon oils to reaction with an oxidizing gas to cause the formation of oxidation products therein, subjecting the oxidized hydrocarbon mixture to the action of a solvent to separate the relatively unsaturated components therefrom, separating the solvent from the dissolved hydrocarbons and causing the latter to react with furfural.

6. The process for the production of synthetic resins which comprises subjecting cracked hydrocarbon oils to reaction with an oxidizing gas to cause the formation of oxidation products therein, subjecting the oxidized hydrocarbon mixture to the action of a solvent to separate the relatively unsaturated components therefrom, separating the solvent from the dissolved hydrocarbons and causing the latter to react with furfural in the presence of sulphuric acid.

ROLAND B. DAY.